United States Patent
Kim et al.

(10) Patent No.: US 9,317,050 B2
(45) Date of Patent: Apr. 19, 2016

(54) METHOD AND APPARATUS FOR CONTROLLING CONVERTER IN FULL CELL VEHICLE

(71) Applicants: Hyundai Motor Company, Seoul (KR); Kia Motors Corporation, Seoul (KR)

(72) Inventors: Ji Tae Kim, Gyeonggi-Do (KR); Boung Ho Min, Gyeonggi-Do (KR); Jae-Moon Lee, Gyeonggi-Do (KR); Ho Sung Kang, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 79 days.

(21) Appl. No.: 14/095,602

(22) Filed: Dec. 3, 2013

(65) Prior Publication Data

US 2014/0167712 A1 Jun. 19, 2014

(30) Foreign Application Priority Data

Dec. 18, 2012 (KR) .................. 10-2012-0148751

(51) Int. Cl.
| | |
|---|---|
| H02M 3/156 | (2006.01) |
| H02M 1/00 | (2007.01) |
| G05F 1/46 | (2006.01) |
| B60L 11/00 | (2006.01) |
| B60L 1/12 | (2006.01) |
| H02M 3/335 | (2006.01) |
| H02M 1/32 | (2007.01) |

(52) U.S. Cl.
CPC ................. *G05F 1/462* (2013.01); *B60L 11/00* (2013.01); *H02M 1/00* (2013.01); *H02M 3/156* (2013.01); *B60L 1/12* (2013.01); *H02M 1/32* (2013.01); *H02M 3/33507* (2013.01); *H02M 2001/0009* (2013.01); *H02M 2001/0025* (2013.01)

(58) Field of Classification Search
CPC .......................... H02M 3/33507; H02M 3/537
USPC ............. 363/95, 97, 131, 140, 34, 35, 37, 40, 363/41, 44, 65
See application file for complete search history.

(56) References Cited

U.S. PATENT DOCUMENTS

| | | | | |
|---|---|---|---|---|
| 4,901,016 A * | 2/1990 | Kusatani | ................. | G01R 33/14 324/210 |
| 2004/0176903 A1* | 9/2004 | Yasu | ................... | F02D 41/1403 701/101 |
| 2004/0190314 A1* | 9/2004 | Yoshida | ................ | H02M 3/285 363/65 |
| 2012/0134186 A1* | 5/2012 | Johnson | ................... | H02J 3/385 363/71 |
| 2012/0141895 A1* | 6/2012 | Kwon | ............... | H01M 8/04037 429/429 |
| 2012/0143422 A1* | 6/2012 | Kitahata | ............. | F16H 57/0484 701/22 |

* cited by examiner

*Primary Examiner* — Timothy J Dole
*Assistant Examiner* — Bryan R Perez
(74) *Attorney, Agent, or Firm* — Mintz Levin Cohn Ferris Glovsky and Popeo, P.C.; Peter F. Corless

(57) ABSTRACT

A method and apparatus for controlling a converter of a fuel cell vehicle that uses a power control value generated based on an inverter DC terminal voltage as a reference value, and generates a current reference signal based on the reference value is provided. More specifically, the method and apparatus output a final reference signal that generates a pulse width modulation (PWM) signal by compensating for the current reference signal based on output terminal current of the converter. A peak value is then increased by amplifying a triangular wave signal, and the amplified triangular wave signal and the compensated final reference signal according to the current reference signal change rate are compared. A PWM signal having a predetermined duty ratio is then generated to control the converter.

5 Claims, 8 Drawing Sheets

METHOD AND APPARATUS FOR CONTROLLING CONVERTER IN FULL CELL VEHICLE

CROSS-REFERENCE TO RELATED APPLICATION

This application claims priority to and the benefit of Korean Patent Application No. 10-2012-0148751 filed in the Korean Intellectual Property Office on Dec. 18, 2012, the entire contents of which are incorporated herein by reference.

BACKGROUND (a) Field of the Invention

The present invention relates to control of a converter, and more particularly, to an apparatus and a method of controlling a large capacity converter used in a fuel cell vehicle.

(b) Description of the Related Art

Fuel cells convert chemical energy generated by oxidization of fuel into electrical energy. Although fuel cells and batteries both utilize a chemical cell which performs an oxidization and reduction reaction, in a battery, the cell reaction is generated inside a closed system, whereas in a fuel cell the fuel and oxidant (reactants) are continuously supplied from outside of the system and then are continuously removed to outside of the system again once the reaction has occurred. Recently, fuel cells have begun to be commercialized, and since a reaction product of the fuel cell is pure water, research related to the use of water as an energy source of an environmentally-friendly vehicle has been actively pursued.

In order to efficiently use energy, a fuel cell vehicle utilizes a hybrid system that has a secondary energy storing device, such as a battery or a super capacitor, in addition to the fuel cell, which is the primary energy source. Here, a bi-directional converter serves to maintain a uniform fuel utilization rate and balance power between the fuel cell and a load by charging and discharging the appropriate amount of energy through an energy storing device, such as a battery. Conventionally, a large capacity bi-directional converter is typically used to control the voltage of a direct current terminal, but when an inverter connected to a motor is regeneratively braked, the bi-directional converter operates in a hybrid control mode, in which output current and power are controlled together or simultaneously, in order to prevent overcurrent failure to from being generated due to a rapid change in the current.

In order to control the converter, a pulse width modulation (PWM) control method using a dedicated chip is typically used. This chip, however, is a PWM generation chip that is appropriate for a small or medium power converter. Thus, the maximum value of a triangular wave for generating the PWM is determined by the size of the chip, and thus the size of the maximum value is limited as a result. Accordingly, there is a limit to the amount of control offer for a large capacity converter, such as a fuel cell system.

FIG. 1 is a graph illustrating a triangular wave generated in a dedicated chip for controlling PWM in the related art. As illustrated in FIG. 1, when the dedicated chip is used, a maximum value of the triangular wave is fixed at approximately 2.3 V. Since maximum value of the triangular wave is limited and thus the amount of control offered, resolution and the degree of level precision of the overall control deteriorate as well. Additionally, the dynamic nature of the system is degraded.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide an apparatus and a method capable of effectively controlling a large capacity converter though pulse width modulation (PWM) control, in which a range of a triangular wave is expanded, in a fuel cell vehicle.

An exemplary embodiment of the present invention provides an apparatus for controlling a converter of a fuel cell vehicle, including: a current reference signal change rate amplifier configured to use a power control value for power control of the converter as a reference value, and generate a current reference signal based on the reference value; a current sensor (e.g., sensor) configured to detect output terminal current of the converter; a current controller configured to compare the current reference signal and the detected output terminal current to output a final reference signal; a triangular wave generator configured to generate triangular wave; a triangular wave amplifier configured to amplify the generated triangular wave signal; and a comparison unit configured to compare the amplified triangular wave signal and the final reference signal to output a pulse wave signal that controls the converter.

In addition, the apparatus may further include a hybrid controller configured to detect an inverter DC terminal voltage input into an inverter connected to a motor of the vehicle, generate the power control value based on the inverter DC terminal voltage, and output the generated power control value to the current reference signal change rate amplifier.

Here, the current reference signal change rate amplifier may set a change rate corresponding to the reference value based on changes rates having different predetermined values for each reference value, and output the current reference signal amplified according to the set change rate.

In some exemplary embodiments, the comparison unit may be configured to output a pulse wave signal of which a change range of a duty ratio is increased by the final reference signal generated based on the amplified triangular wave signal and the current reference signal amplified according to the change rate.

Additionally, in some exemplary embodiments, the converter may be a bi-directional high voltage DC-DC converter (BHDC).

Another exemplary embodiment of the present invention provides a method of controlling a converter of a fuel cell vehicle, including: detecting, by a sensor, an inverter DC terminal voltage input in an inverter connected to a motor of the vehicle, and generating, by a controller, a power control value that controls the converter based on the inverter DC terminal voltage; using the power control value that controls power of the converter as a reference value, generating, by a first amplifier, a current reference signal based on the reference value, and outputting the generated current reference signal; outputting, by the first amplifier a final reference signal for generating a pulse width modulation (PWM) signal by compensating for the current reference signal based on output terminal current of the converter; generating a triangular wave signal by a wave generator, and amplifying, by a second amplifier, the triangular wave signal; and comparing, by a comparison unit, the amplified triangular wave signal and the final reference signal, generating, by the comparison unit, the PWM signal having a predetermined duty ratio, and outputting, by the comparison unit the generated PWM signal to the converter.

Additionally, in some exemplary embodiments of the present invention, generating of the current reference signal and the outputting of the generated current reference signal may include setting a change rate corresponding to the reference value based on changes rates having different predetermined values for each reference value, and outputting the current reference signal amplified according to the set change According to the exemplary embodiment of the present invention, it is possible to effectively control a large capacity converter through PWM control in which a range of a triangular wave is expanded due to additional control parameters. Accordingly, it is possible to overcome any reductions in the degree of precision of control and dynamic properties of the converter, and achieve a rapid, dynamic, stabilized control by improving resolution and the degree of precision of the control of a large capacity bi-directional converter.

DETAILED DESCRIPTION OF THE EMBODIMENTS

Figure 1:
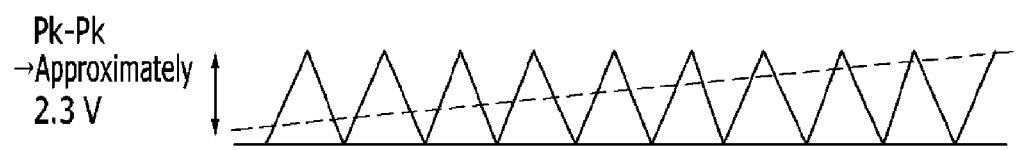
FIG. 1 is a graph illustrating a triangular wave generated in a dedicated chip for PWM control in the related art.
Figure 1:
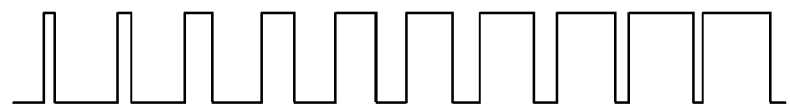

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles, fuel cell vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Additionally, it is understood that the below methods and units are executed by at least one processor within at least controller. The term controller refers to a hardware device that includes a memory and a processor. The memory is configured to store the modules/units and the processor is specifically configured to execute said units to perform one or more processes algorithmically. These processes are described further below. Additionally, each of these units may be controlled by the same processor or different processors without diverting from the overall intention of the is present invention. Therefore, the processor by which the each unit is executed is irrelevant to overall operation of the present invention.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an apparatus and a method of controlling a converter of a fuel cell vehicle according to an exemplary embodiment of the present invention will be described with reference to the drawings.

Figure 2:
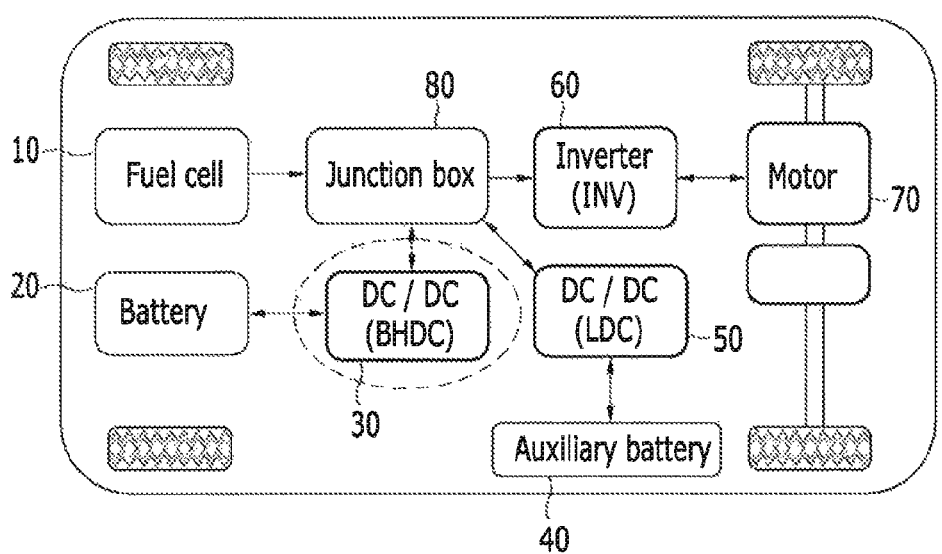
FIG. 2 is a diagram illustrating a structure of a fuel cell vehicle according to an exemplary embodiment of the present invention

FIG. 2 is a diagram illustrating a structure of a fuel cell vehicle according to an exemplary embodiment of the present invention. As illustrated in FIG. 2, the fuel cell vehicle according to the exemplary embodiment of the present invention includes a fuel cell 10 operating as a main power source of the fuel cell vehicle, a battery 20 operating as an auxiliary power source for the fuel cell vehicle, a bi-directional high voltage DC-DC converter (BHDC) 30, an auxiliary battery 40, a lower voltage DC-DC converter (LDC) 50, an inverter 60, a motor 70, and a junction box 80.

The fuel cell 10 receives fuel (e.g., hydrogen) from a storage tank and receives an oxidant (e.g., air) from a supply device (not illustrated) to generate electricity via an electrochemical reaction of the fuel and oxidant.

The battery 20 charges the electricity generated by the fuel cell 10, and supplies power for driving several fuel cell balance of plants (BOP) (including the air blower, a hydrogen recirculation blower, a coolant circulating pump, and the like) necessary for the driving of the fuel cell.

The BHDC 30 may be a bi-directional converter that matches a balance between different output voltages of the high voltage battery 20 and the fuel cell 10. That is, the BHDC 30 boosts the voltage from a high voltage battery to output the boosted voltage to a high voltage bus terminal, starts the fuel cell 10, and charges the high voltage battery 20 by decreasing the high voltage to a predetermined voltage.

The auxiliary battery 40 may be a 12 V battery that supplies power to components of the vehicle using a predetermined driving voltage. The components using the auxiliary battery 10 as the power source continuously consume power during the driving of the vehicle, as such, the LDC 50 controls the power supply of the auxiliary battery 10 in order to charge the components.

The inverter 60 and the motor 70 may be connected to the high voltage bus terminal to which the fuel cell 10 and the BHDC 30 are connected. The inverter 60 is configured to switch a voltage input from the high voltage bus terminal, convert the switched voltage to a three-phase AC power source, and then supply the converted three-phase AC power source to the motor 70 as a means of driving the motor.

The junction box 80 in the illustrative embodiment of the present invention is disposed between the BHDC 30 and the inverter 60, to control the amount of power transmitted to the battery 20 and to control the amount of power transmitted from the battery 20 to a peripheral system.

Figure 3:
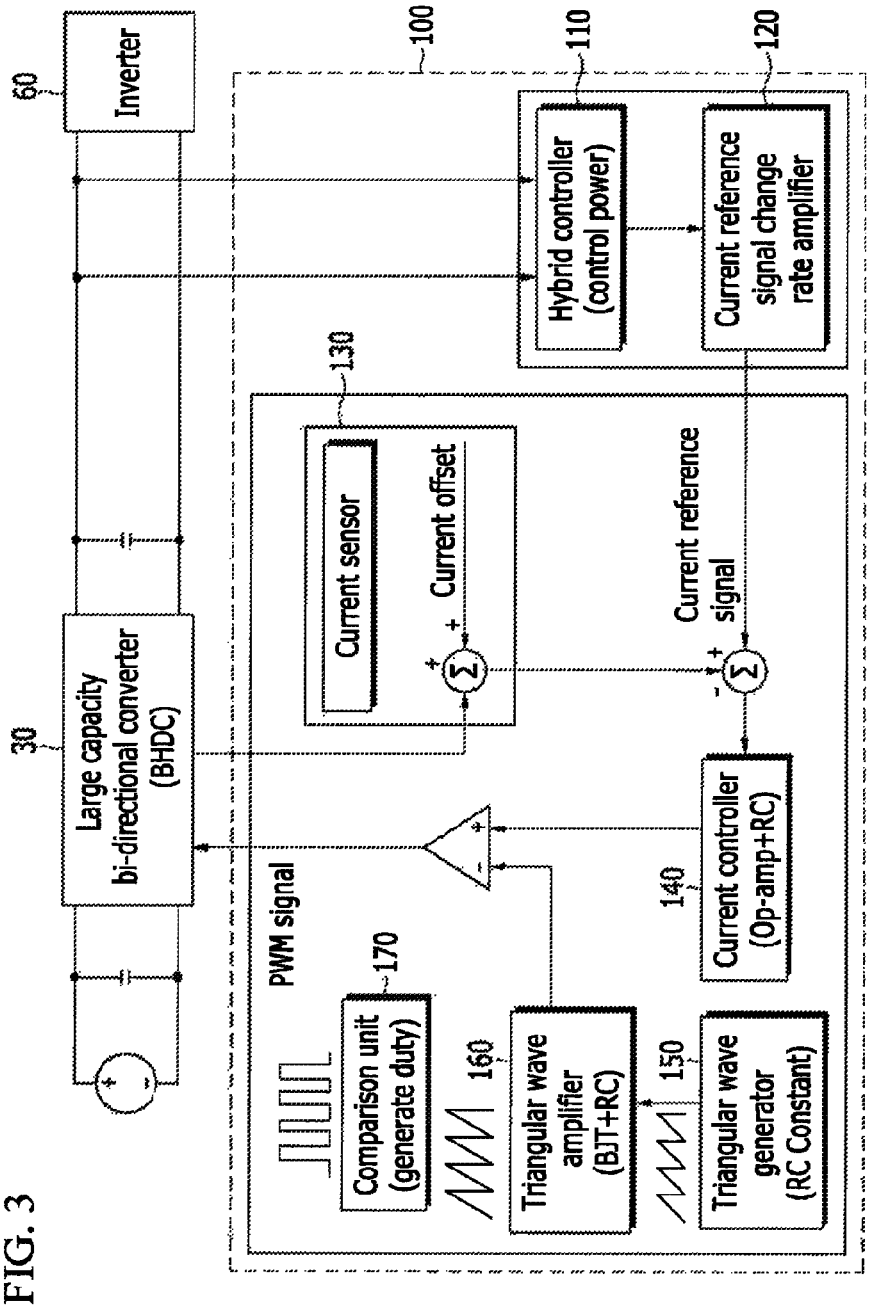
FIG. 3 is a diagram illustrating a structure of a converter control apparatus according to the exemplary embodiment of the present invention.

In the fuel cell vehicle having the aforementioned structure, a converter control apparatus according to the exemplary embodiment of the present invention may have a structure as is illustrated in FIG. 3.

FIG. 3 is a diagram illustrating a structure of a converter control apparatus according to the exemplary embodiment of the present invention. The converter control apparatus 100 according to the exemplary embodiment of the present invention generates a pulse width modulating (PWM) signal that controls the BHDC 30, that is, the large capacity bi-directional converter, and supplies the generated PWM signal to the large capacity bi-directional converter 30.

To this end, as illustrated in FIG. 3, the converter control apparatus 100 includes a hybrid controller 110 that is configured to detect an inverter DC terminal voltage input in the inverter 60 and generate a power control value that controls power by using the detected voltage. Also included in the BHDC 30 is a current reference signal change rate amplifier 120 that utilizes the power control value as the reference value, sets a current reference signal change rate based on the reference value, and outputs a current reference signal corresponding to the set change rate. A current sensor 130 is configured to detect an output terminal current of the BHDC 30. A current controller 140 is configured to compare the applied current reference signal and the detected output terminal current and performing compensation control according to a result of the comparison to output a final reference signal.

Additionally, a triangular wave generator 150 is configured to generate a triangular wave. This triangular wave, is then input into a triangular wave amplifier 160 that amplifies a generated triangular wave signal, which is then compared with the final reference signal in a comparison unit 170. As a result of the comparison, a pulse wave signal (e.g., a PWM signal) for the control of the BHDC is generated and output to the BHDC 30.

The BHDC 30 controls a voltage and current of the output terminal in order to supply corresponding power to the inverter 60 according to a command output from a superordinate controller (for example, a fuel cell control unit (FCU) (not illustrated).

In order to prevent an overcurrent failure, the hybrid controller 110 detects an inverter DC terminal voltage output from the output terminal of the BHDC 30 and input in the inverter 60, and generates a power control value based on the detected voltage. The hybrid controller 110 in particularly, control output current and power in order to prevent overcurrent failure from being generated due to a rapid change in the current of the inverter during regenerative braking, and generate a power control value for the control of the output current and power.

The current reference signal change rate amplifier 120 uses the power control value of the hybrid controller as a reference value, and generates a current reference signal for generating a PWM signal based on the reference value. In the exemplary embodiment of the present invention, in order to generate a current reference signal corresponding to a triangular wave having an increased peak value, not a triangular wave having a fixed peak value as is done in the prior art, the current reference signal change rate amplifier 120 uses the power control value based on the inverter DC terminal voltage as the reference value, and sets a change rate corresponding to the reference value based on the change rates having different predetermined values for each reference value.

Further, the current reference signal change rate amplifier 120 generates a current reference signal amplified according to the set change rate to output the generated current reference signal. As described above, the current reference signal change rate amplifier 120 may perform a routine subdivision of the reference value to improve resolution of the current reference signal.

The current controller 140 compares the applied current reference signal and the output terminal current of the BHDC 30 detected by the current sensor 130 to output the final reference signal for generating the PWM signal. The final reference signal is then compared with the triangular wave, so that a pulse wave signal, that is, the PWM signal, in which a duty ratio is varied, is generated.

Simultaneously, the triangular wave generator 150 generates the triangular wave signal, and especially, in order to generate the triangular wave signal having a peak value of the triangular wave, which is increased approximately two times or more compared to that of the related art, the triangular wave amplifier 160 amplifies the triangular wave signal output from the triangular wave generator 150 and outputs the amplified triangular have signal to the comparison unit 170.

The comparison unit 170, which may or may not be a part of the current controller 140, generates a PWM signal having a predetermined duty ratio by comparing the triangular wave signal of which the peak value is amplified and the compensated final reference signal according to the change rate of the current reference signal, and outputs the generated PWM signal to the BHDC 30. Additionally, the comparison unit 170 may be embodied as a processor that is specifically configured to execute the above functions, this processor may be a part of any one of the controllers described herein or may be alternatively an independently operated processor.

In the related art, the peak value of the triangular wave is limited and the resolution is degraded. However, according to the exemplary embodiment of the present invention, the peak value of the triangular wave is directly amplified to generate the triangular wave, and differently apply the reference signal appropriate to the triangular while according to a subdivided change rate, thereby overcoming the limited control capacity of the related art.

Figure 4:
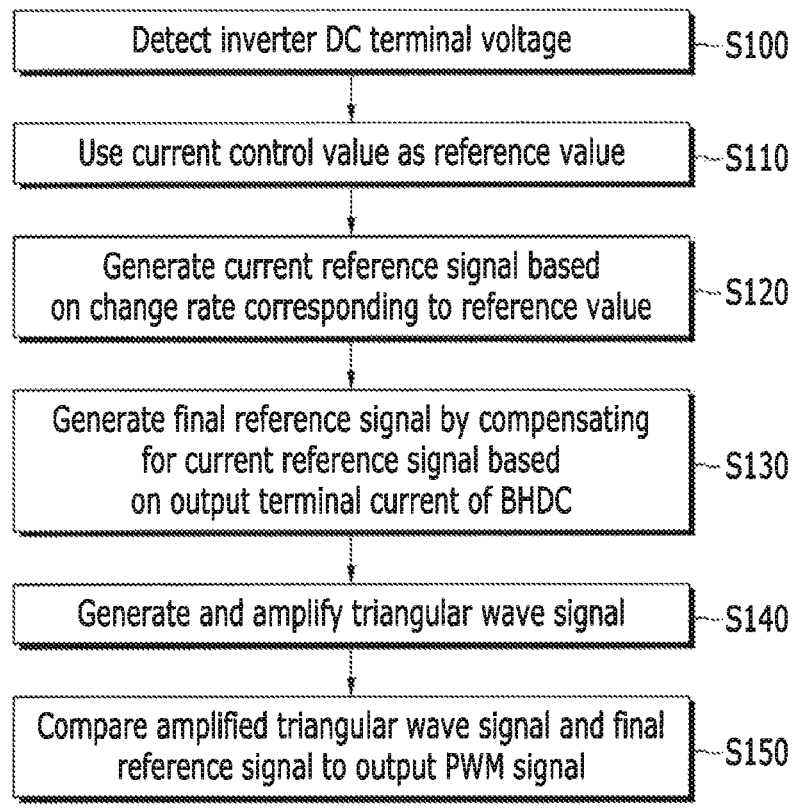
FIG. 4 is a flowchart of a method of controlling the converter according to the exemplary embodiment of the present invention.

FIG. 4 is a flowchart of a method of controlling the converter according to the exemplary embodiment of the present invention. The hybrid controller 110 detects an inverter DC terminal voltage output from the output terminal of the BHDC 30 to be input in the inverter 60 (S100), and generates a power control value based on the detected voltage.

Further, the current reference signal change rate amplifier 120 uses the power control value as a reference value (S110), and sets a change rate corresponding to the reference value based on change rates having different predetermined values for each reference value. In addition, the current reference signal change rate amplifier 120 generates a current reference signal amplified according to the set change rate and outputs the generated current reference signal (S120). Then, the current controller 140 compensates for the current reference signal based on the output terminal current of the BHDC 30 to output a final reference signal for generating a PWM signal (S130).

In the meantime, the triangular wave generator 150 generates a triangular wave signal, and especially, in order to generate the triangular wave signal having a peak value of the triangular wave, which is increased approximately two times or more compared to that of the related art, the triangular wave amplifier 160 amplifies the triangular wave signal (S140). Then, the comparison unit 170 compares the triangular wave signal of which the peak value is amplified and the compensated final reference signal according to the current reference signal change rate, generates the PWM signal having a predetermined duty ratio, and outputs the generated PWM signal to the BHDC 30 (S150).

According to the converter control apparatus 100 operated as described above, it is possible to increase a maximum value of the triangular wave by approximately two times or more compared to the commercialized PWM chip in the related art, and it is possible to precisely control the converter by generating the PWM signal, in which a change range of the duty ratio is finer, through the comparison unit.

Figure 5A:
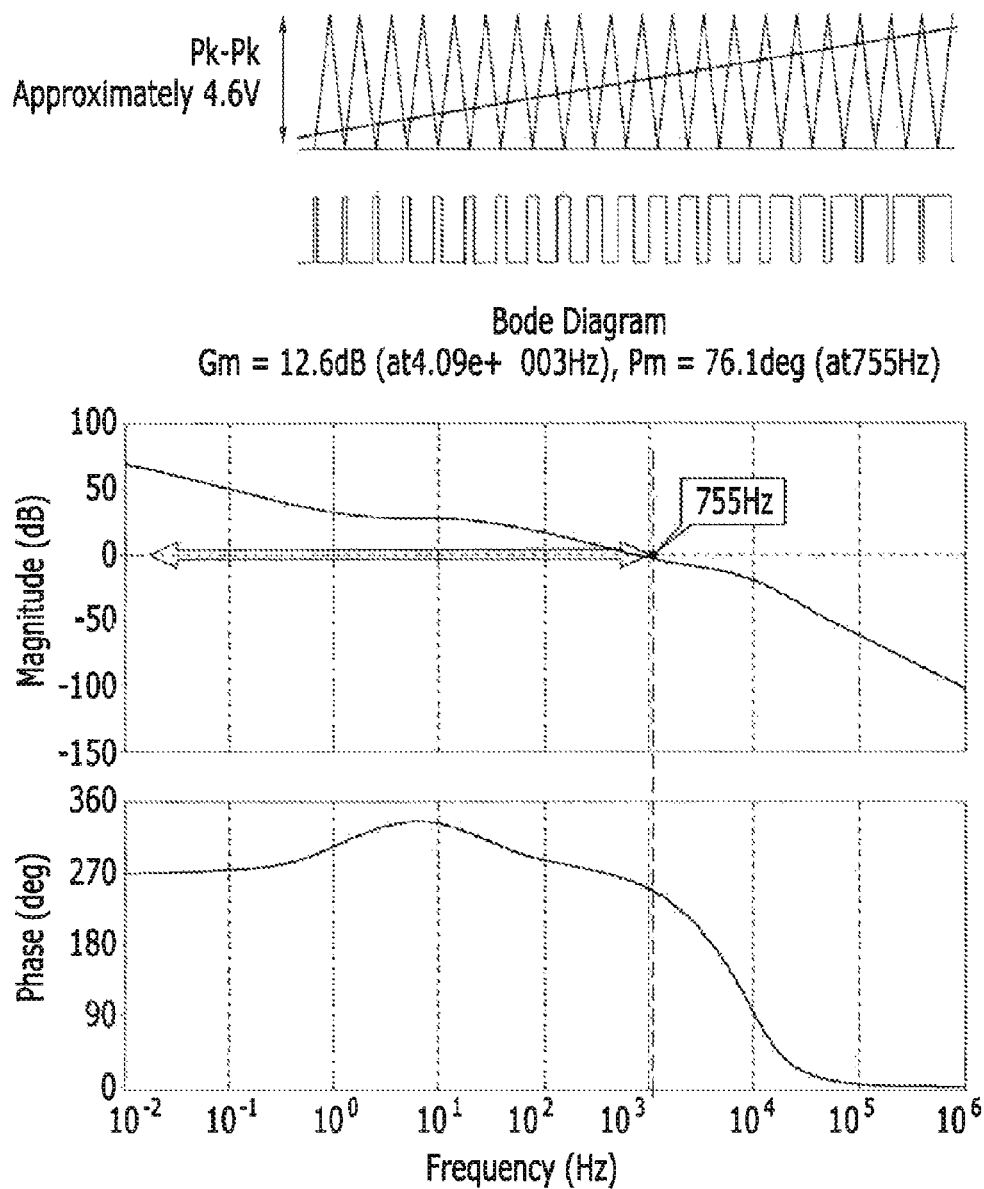
FIGS. 5A and 5B are diagrams illustrating characteristics of a triangular wave signal and a PWM signal generated by the converter control apparatus according to the exemplary embodiment of the present invention, and characteristics of a triangular wave signal and a PWM signal generated by the commercialized PWM chip in the related art, respectively.
Figure 5B:
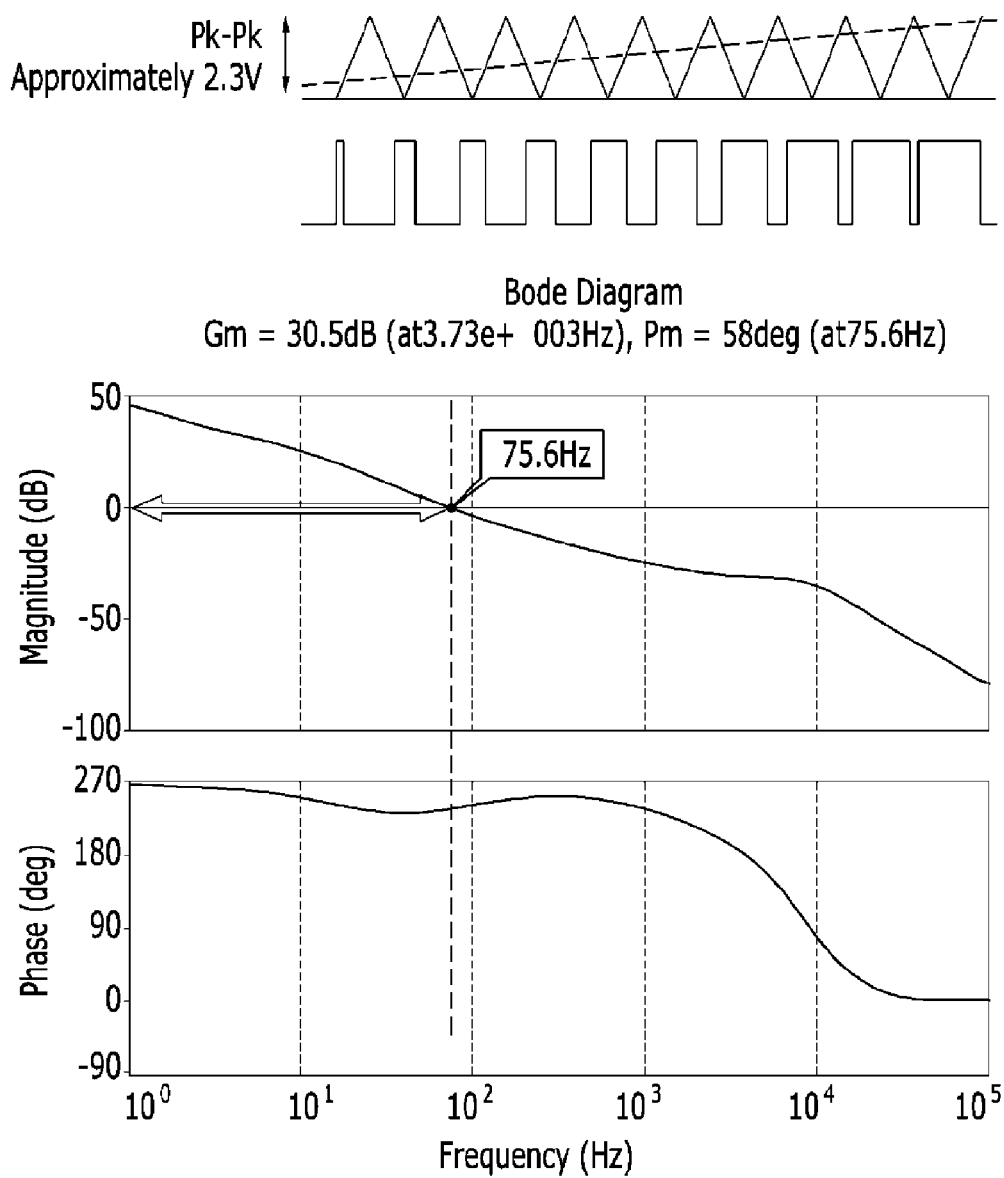

FIGS. 5A and 5B are diagrams illustrating characteristics of a triangular wave signal and a PWM signal generated by the converter control apparatus according to the exemplary embodiment of the present invention, and characteristics of a triangular wave signal and a PWM signal generated by the commercialized PWM chip in the related art, respectively.

As illustrated in FIGS. 5A and 5B, it can be seen that the peak value of the triangular wave signal according to the exemplary embodiment of the present invention is approximately two times larger than that of the triangular wave signal in the related art. Accordingly, it can be seen that the triangular wave signal having a higher peak value and the PWM signal generated based on the final reference signal varied in consideration of the triangular wave signal has a finer change range of the duty ratio than the PWM signal generated based on the low peak value and the fixed reference signal without considering the triangular wave in the related art, so that the range of the duty ratio is increased. Referring to a bode diagram, it can be seen that a bandwidth (e.g., 755 Hz) of the PWM control method according to the exemplary embodiment of the present invention is approximately 10 times higher than a bandwidth (e.g., 75.6 Hz) of the PWM control method in the related art.

As described above, as the range of the duty ratio of the PWM signal is increased, a degree of precision of the control for the large capacity bi-directional converter and a degree of precision of the control of the voltage and the current by using the hybrid controller are further improved.

Figure 6A:
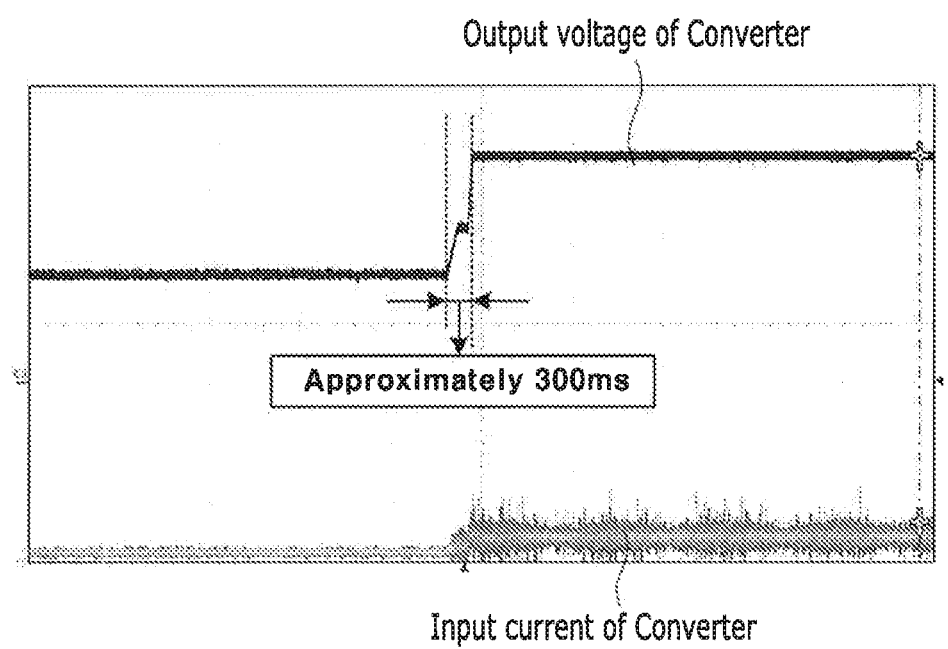
FIG. 6A is a diagram illustrating a vehicle start waveform obtained in a case where a vehicle start is performed according to the converter control device according to the exemplary embodiment of the present invention.
Figure 6B:
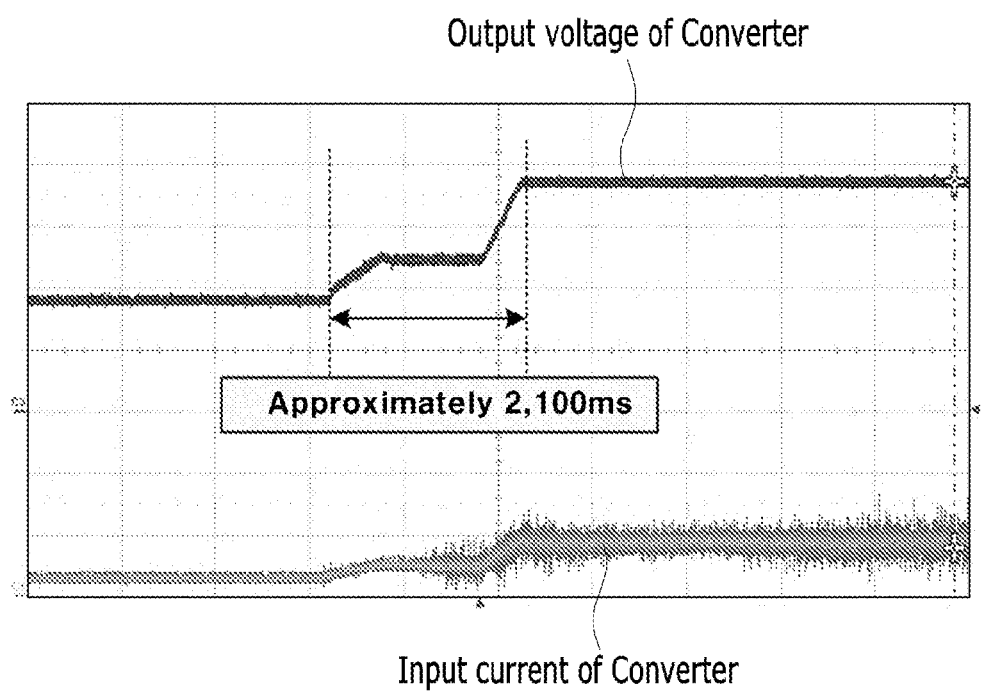
FIG. 6B is a diagram illustrating a vehicle start waveform obtained in a case where a vehicle start is performed based on the commercialized PWM chip in the related art.

Based on the PMW signal, a start characteristic illustrated in FIG. 6 may be obtained when the vehicle actually starts. FIG. 6A is a diagram illustrating a vehicle start waveform obtained in a case where a vehicle start is performed according to the converter control device according to the exemplary embodiment of the present invention, and FIG. 6B is a diagram illustrating a vehicle start waveform obtained in a case where a vehicle start is performed based on the commercialized PWM chip in the related art.

The fuel cell vehicle, which is a system including two types of large capacity DC sources, requires a high control speed, and when the apparatus and the method according to the exemplary embodiment of the present invention are applied to the fuel cell vehicle, the control is approximately seven times faster than the related art, and a nearly immediate reaction to a change in the system may be realized. That is, according to a start waveform illustrated in FIG. 6A, a speed for the start is approximately 300 ms. According to the method in the related art illustrated in FIG. 6B, a speed for the start is approximately 2,100 ms. Accordingly, as can be seen from the start waveform of the actual vehicle, according to the exemplary embodiment of the present invention, it can be seen that the start speed is improved by approximately seven times that of the related art. Additionally, through the aforementioned improvement of the control speed, it is possible to improve fuel efficiency and efficiency of the vehicle.

The aforementioned apparatus and method of controlling the converter according to the exemplary embodiment of the present invention may implement various functions in the vehicle. For example, the aforementioned apparatus and method of controlling the converter according to the exemplary embodiment of the present invention may also be applied to a quick start, start on/off control, and the like. Further, the aforementioned apparatus and method of controlling the converter according to the exemplary embodiment of the present invention may be applied to various types of large capacity power converters required in an environmentally-friendly vehicle.

Furthermore, the exemplary embodiment of the present invention is not implemented only through the aforementioned apparatus and/or method, and may be implemented through a program for realizing a function corresponding to the configuration of the exemplary embodiment of the present invention, a recording medium in which the program is recorded, and the like, and a person of ordinary skill in the art may easily implement the implementation from the description of the aforementioned exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a converter of a fuel cell vehicle, comprising:
 a hybrid controller connected to an input of an inverter connected to a motor of the vehicle to detect an inverter DC terminal voltage input in the inverter;
 a first amplifier directly connected to the hybrid controller and configured to utilize a power control value generated by the hybrid controller for power control of the converter as a reference value, and generate a current reference signal based on the reference value;
 a current sensor connected to an output of the converter to detect output terminal current of the converter;

a current controller connected to the current sensor and configured to compare the current reference signal and the detected output terminal current to output a final reference signal;

a triangular wave generator configured to generate a triangular wave;

a second amplifier configured to amplify the generated triangular wave signal; and a comparison unit connected to the current controller and second amplifier to compare the amplified triangular wave signal and the final reference signal to output a pulse wave signal to the converter for controlling the converter, wherein the first amplifier sets a change rate corresponding to the reference value based on change rates having different predetermined values for each reference value, and outputs the current reference signal amplified according to the set change rate.

2. The apparatus of claim 1, wherein:

the comparison unit outputs a pulse wave signal of which a change range of a duty ratio is increased by the final reference signal generated based on the amplified triangular wave signal and the current reference signal amplified according to the change rate.

3. The apparatus of claim 1, wherein:

the converter is a bi-directional high voltage DC-DC converter (BHDC).

4. A method of controlling a converter of a fuel cell vehicle, comprising:

detecting, by a hybrid controller, an inverter DC terminal voltage input in an inverter connected to a motor of the vehicle, and generating a power control value for controlling the converter based on the inverter DC terminal voltage;

using, by a first amplifier directly connected to the hybrid controller, the power control value for controlling power of the converter as a reference value, generating a current reference signal based on the reference value, and outputting the generated current reference signal;

outputting, by the first amplifier, a final reference signal for generating a pulse width modulation (PWM) signal by compensating for the current reference signal based on output terminal current of the converter;

generating, by a wave generator, a triangular wave signal;

amplifying, by a second amplifier, the triangular wave signal; and comparing the amplified triangular wave signal and the final reference signal, generating the PWM signal having a predetermined duty ratio, and outputting the generated PWM signal to the converter, wherein the generating of the current reference signal and the outputting of the generated current reference signal includes setting a change rate corresponding to the reference value based on change rates having different predetermined values for each reference value, and outputting the current reference signal amplified according to the set change rate.

5. A non-transitory computer readable medium containing program instructions executed by a processor, the computer readable medium comprising:

program instructions that control a hybrid controller to generate a power control value for controlling a converter in a fuel cell vehicle based on a detected inverter DC terminal voltage;

program instructions that control an amplifier directly connected to the hybrid controller to use the power control value for controlling power of the converter as a reference value, and generate a current reference signal based on the reference value, and output the generated current reference signal;

program instructions that output a final reference signal for generating a pulse width modulation (PWM) signal by compensating for the current reference signal based on output terminal current of the converter;

program instructions that generate a triangular wave signal;

program instructions that amplify the triangular wave signal; and program instructions that compare the amplified triangular wave signal and the final reference signal, generating the PWM signal having a predetermined duty ratio, and outputting the generated PWM signal to the converter, wherein the program instructions that generate the current reference signal and the output the generated current reference signal include program instructions that set a change rate corresponding to the reference value based on change rates having different predetermined values for each reference value, and output the current reference signal amplified according to the set change rate.

* * * * *

UNITED STATES PATENT AND TRADEMARK OFFICE
CERTIFICATE OF CORRECTION

PATENT NO. : 9,317,050 B2  Page 1 of 1
APPLICATION NO. : 14/095602
DATED : April 19, 2016
INVENTOR(S) : Ji Tae Kim et al.

It is certified that error appears in the above-identified patent and that said Letters Patent is hereby corrected as shown below:

Title Page and in the Specification, Column 1, please replace the Title as follows:

from

METHOD AND APPARATUS FOR CONTROLLING CONVERTER IN FULL CELL VEHICLE to

METHOD AND APPARATUS FOR CONTROLLING CONVERTER IN FUEL CELL VEHICLE

Signed and Sealed this
Twenty-first Day of June, 2016

Michelle K. Lee
*Director of the United States Patent and Trademark Office*